April 4, 1944.   M. APUZZO   2,345,998
COMBINATION ANIMATED DAY AND NIGHT SIGN
Filed July 11, 1941
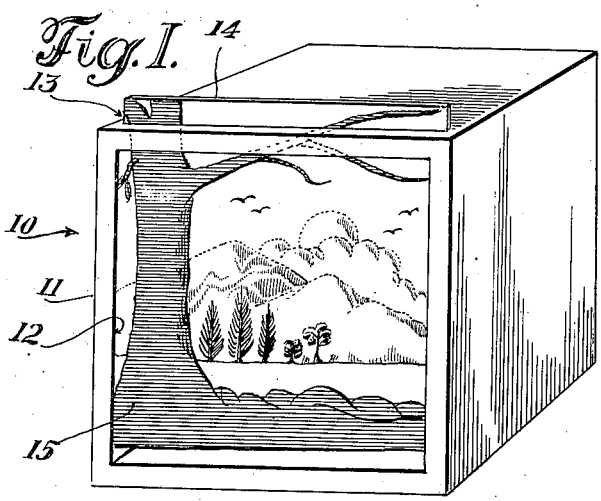
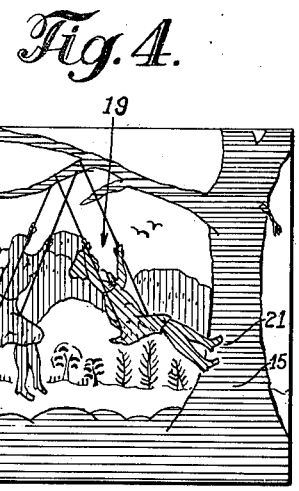
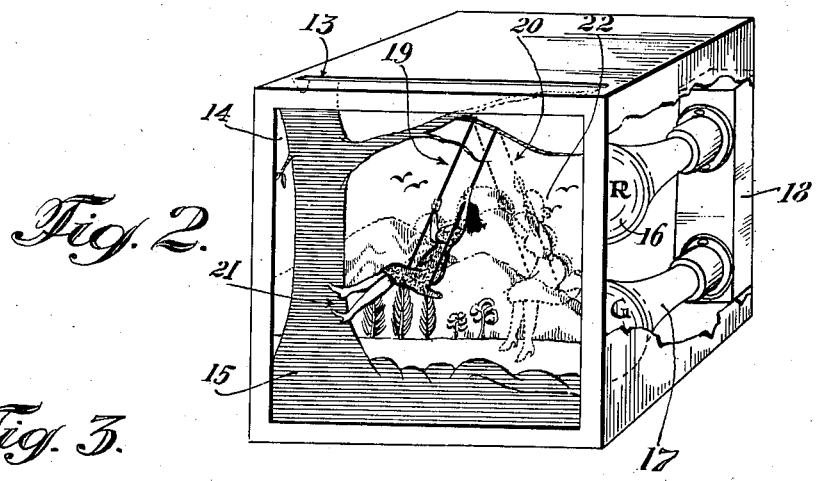
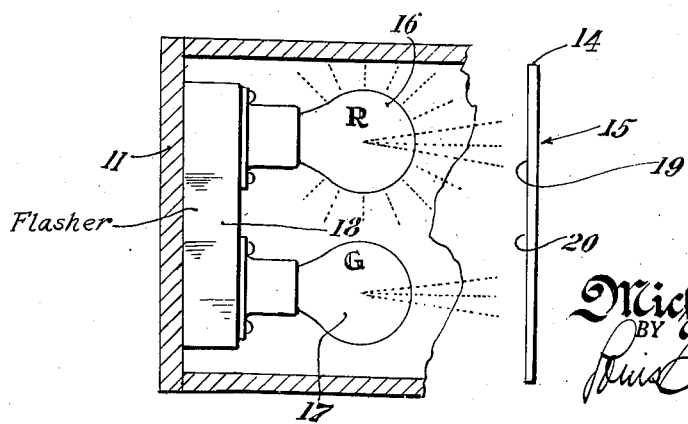
INVENTOR.
Michael Apuzzo
BY
Louis Shumacher, Atty.

Patented Apr. 4, 1944

2,345,998

UNITED STATES PATENT OFFICE 2,345,998

COMBINATION ANIMATED DAY AND NIGHT SIGN

Michael Apuzzo, Brooklyn, N. Y.

Application July 11, 1941, Serial No. 401,912

1 Claim. (Cl. 40—132)

This invention relates to devices such as animated day and night signs, used for advertising purposes and the like.

One object of the invention is to provide a device of the character described having improved means for producing a combination animated day and night sign such that the colored portions thereof shall not be affected by extraneous light including sunlight, regardless whether the sign be illuminated to show an animated picture during the daytime or at night, the operation being effected at such efficiency that highly sensitive wave lengths of the colors would not be affected.

Another object of the invention is the provision of a device of the type mentioned wherein a plurality of differently colored screened pictures or portions thereof are providing complemental to a neutral or black and white picture, the colored pictures being alternately absorbed by light of differently colored lamps or the like whereas the neutral picture is always visible to thus afford an animated picture on a constant pictorial background, with the utilization of a light diffusing screen whose capacity is such that the neutral picture at the front thereof shall be easily visible whereas the colored pictures at the back thereof shall be invisible when the lamps are out, despite the tendency of daylight to infiltrate the device and extraneous colored light sources to render visible the colored pictures, whereby the neutral picture is not confused by the underlying overlapping colored pictures during the daytime.

Heretofore, it has been known to provide screens having two or more pictures in different colors and complemental sources of illumination of different color alternately operated by suitable flashers to produce animated advertising signs, according as certain of the pictures or portions thereof were absorbed by light of like color or rendered dark or black by light of a different color. Such illuminated signs were operated only at night; in the daytime, the sign would represent mainly a blank space or void. To produce an illuminated, animated picture during the daytime, it was proposed to place one colored picture on the front and another on the back of a screen. This was inoperative due to the change in wave length of the front picture caused by the extraneous light. To avoid the blank space during daylight, it was proposed to utilize a still picture of neutral color which would be visible during the daytime. Difficulty was encountered because the colored pictures would show through in subdued form in daylight, sufficiently so to confuse the neutral still picture. In an attempt to avoid this drawback in signs of better quality, it was proposed to employ diffraction screens to thoroughly hide the colored pictures in the daytime, but the neutral still pictures were placed back of the diffraction screens and were blotted out at nighttime upon illumination at the rear of the screen. Considering that the neutral, still advertising picture, which was valuable for daylight display, ought to be maintained at nighttime, I perceived that the element of attractiveness inherent in an animated picture could be added to the neutral still picture with substantial advantage because the public would recognize the still picture which it had seen during the daytime and note its transformation by the correlated animated picture, thus introducing the element of surprise. I also perceived that this feature could be combined with an animated daytime sign.

Other objects and advantages of the invention will become apparent as the specification proceeds.

With the aforesaid objects in view, the invention consists in the novel combinations and arrangements of parts hereinafter described in their preferred embodiments, pointed out in the subjoined claim, and illustrated in the annexed drawing, wherein like parts are designated by the same reference characters throughout the several views.

Figure 1 is an isometric perspective showing a device embodying the invention as seen by daylight.

Figure 2 is a similar view of the device as seen at nighttime by internal illumination with the animated picture visible as shown in full and in dotted lines, and with a portion of the casing removed to show the means for producing illumination in alternating different colors.

Fig. 3 is a fragmentary sectional view of the device.

Fig. 4 is a rear view on a reduced scale of the screen, showing the different light absorption pictures lined for different colors.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing 10 denotes a device embodying the invention. The same may comprise a casing 11 having at the front thereof a window opening 12 and at its top a slot 13 for removably slidably receiving a screen 14, having on the front face thereof a picture 15 which is visible through said window when the latter is closed by the inserted screen. Within the casing 11 is located a flashing means for lights of different colors. This may include different sources of light such as electric lamps 16, 17 connected in circuit with a flasher switch 18 by any suitable circuit, not shown, whereby the lamps are alternately energized.

Complemental to the picture 15, which is in black and white or so called neutral color, other pictures 19 and 20 are formed in color on the inner or rear face of the screen. These pictures are shown in full and dotted lines respectively. The pictures 19 and 20 are coordinated with each other to show different positions of a representation to thus produce an animated picture when seen in rapid alternation; and they are correlated with the picture 15 so that the latter forms a background or setting for the animated picture or produces a composite effect or message therewith. These pictures 19 and 20 are so related in color to each other and to the lamps 16, 17 that one or the other is seen according to the lamp that is momentarily lit. For example, if the lamps 16 and 17 be colored respectively red and green and the pictures 19 and 20 be colored respectively green and red, then when the red lamp 16 is in operation the green picture 19 is clearly seen and appears relatively black while the red picture 20 is absorbed and rendered invisible, and vice versa, when the green lamp 17 is operated and the red lamp 16 deenergized. To obtain clear and perfect results the colored pictures 19 and 20 should not be affected by extraneous light either at night when the lamps are in operation or in the daytime when the lamps are or are not in use. Such extraneous light, particularly if colored, would affect the pictures 19 and 20, and produce a partial or overlapping showing of the pictures. Moreover, it is essential that when the picture 15 is in use during the daytime as a still representation, the pictures 19 and 20 shall not show through the translucent screen 14, even under the influence of extraneous colored lights, which the casing 11 is intended to exclude.

To accomplish these results, the screen 14 is relatively semi opaque in character. Desirably it is totally white or opal like through its entire body and may consist of glass or Celluloid.

The opacity of this translucent screen is sufficient in the daytime to exclude or conceal the colored pictures 19 and 20 which showed in subdued form through screens heretofore used and hence overlapping or conflicting images were indicated which produced confusion with the picture 15. With the screen 14, the pictures 19 and 20 are wholly invisible even in the presence of extraneous colored light. I discovered that this unexplainable result could be produced and nevertheless renders the pictures 19 and 20 clearly visible by illumination from the lamps 16, 17. Sufficiently powerful illumination is provided for this purpose, but the neutral picture 15 is clearly visible because the screen 14 acts as a diffusion medium, without causing diffraction of light. The uniform and homogeneous character of Celluloid and glass permits highly satisfactory results to be attained. The screen 14 may be quite tough, but it may be reenforced, if desired, by one or more sheets of transparent material.

Moreover, if the device be used as an illuminated sign during the daytime, the opacity of the screen will be sufficient to exclude extraneous light from affecting the highly sensitive wave lengths of the different pictures and preventing absorption thereof by the colored light of the lamps. It will be understood that the term "picture" as used herein may denote any representation, slogan or part thereof or other advertising matter. It will also be noted that the term "screen" may include any device comprising separate screen components. For example, each or any of the pictures 15, 19 and 20 may be on a clear transparent film, glass or the like, and an opal-like totally white translucent light diffusing screen such as 14 being disposed back of the picture 15 and in front of the pictures 19 and 20. As before, the screen 14 will absorb extraneous light and prevent it from affecting the colors of the pictures 19 and 20, so that the wave lengths are accurate for complete absorption of these pictures upon alternate operation of their respective lamps 16 and 17 as hereinbefore described, with the color of the screen 14 changing according to the color emitted by the energized lamp.

It may be added that certain portions of the picture 15 may be in absorption colors, that is, colors complemental to the lamps 16 and 17, so that a part of the picture 15 which may overlap one of the pictures 19, 20 may be absorbed when that picture is rendered visible by the internal colored light. Thus a considerable degree of attractive coordination in various ways between the different pictures may be effected. Of course this would require that certain extraneous colored light shall not be present or shall be screened out or shielded away. Such portions may be present at 21, and 22 and may be absorbed and invisible in Fig. 2 at the pictures 19 and 20 respectively. Thus when the picture 19 appears the portion 21 is absorbed, just as the picture 20 is. When the picture 20 appears, the picture 19 and the portion 22 are absorbed.

I claim:

A device including a display apparatus adapted to exhibit a clear still picture by external reflected light during the daytime and to exhibit during the nighttime by transmitted light of different colors an animated picture complemental to the still picture, comprising a sheet member, sources of light of different colors confined to the rear face of the sheet member, the latter having at the front face thereof a representation principally in black and white serving as the said still picture, the said sheet member having at the rear face thereof representations in different colors like those of said light sources of an object in different positions complemental to the said still picture, said sheet member being a white opal translucent means having solely a light diffusing and light absorbing capacity and having sufficient opacity to exclude extraneous light from affecting the colors of said representations when illuminated by transmitted light in the daytime and at night and to render said representations invisible when the said member is illuminated only by daylight at the front thereof and being sufficiently translucent to permit the representations to be seen at the front when illuminated by transmitted light from said sources at the rear of said member, said colors of the representations having such relation to each other and to the colors of the transmitted light as to cause the different colored representations to be rendered alternately visible or substantially invisible as the sources of light go alternately on and off, with the said still picture being continuously visible during operation of said sources of light, and means for alternately energizing the differently colored sources of light, certain portions of the said still picture comprising minor sections on the front face of said screen in a color having a wave length like that of the color of one of the representations at the rear face of said screen, and overlapping one of said color representations.

MICHAEL APUZZO.